(12) United States Patent
Won et al.

(10) Patent No.: US 11,014,477 B2
(45) Date of Patent: May 25, 2021

(54) LUMBAR SUPPORT DEVICE FOR VEHICLE SEAT

(71) Applicants: Hyundai Motor Company, Seoul (KR); Kia Motors Corporation, Seoul (KR)

(72) Inventors: Tae Hee Won, Hwaseong-Si (KR); Gil Ju Kim, Seoul (KR); Ju Hyun Cha, Seoul (KR); Ju Yeol Kong, Ansan-Si (KR); Chan Ho Jung, Gunpo-Si (KR); Jae Hun Ryu, Ansan-Si (KR); Kwang Bin Im, Anyang-Si (KR); Hyuk Kim, Ansan-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/584,595

(22) Filed: Sep. 26, 2019

(65) Prior Publication Data
US 2020/0331370 A1    Oct. 22, 2020

(30) Foreign Application Priority Data

Apr. 22, 2019    (KR) .......................... 10-2019-0046574

(51) Int. Cl.
| | | |
|---|---|---|
| *B60N 2/66* | (2006.01) | |
| *B60N 2/64* | (2006.01) | |
| *B60N 2/68* | (2006.01) | |
| *B60N 2/90* | (2018.01) | |

(52) U.S. Cl.
CPC .............. *B60N 2/66* (2013.01); *B60N 2/933* (2018.02)

(58) Field of Classification Search
CPC .................................. B60N 2/66; B60N 2/933
USPC ........................................................ 297/284.4
See application file for complete search history.

(56) References Cited

U.S. PATENT DOCUMENTS

| | | | | |
|---|---|---|---|---|
| 3,807,794 A | * | 4/1974 | Beyer .................... | A47C 7/462 297/284.4 |
| 3,890,000 A | * | 6/1975 | Easley ................. | B60N 2/0232 297/284.4 |
| 3,948,558 A | * | 4/1976 | Obermeier ............. | A47C 7/462 297/284.4 |
| 4,182,533 A | * | 1/1980 | Arndt ..................... | A47C 7/462 297/284.4 |

(Continued)

FOREIGN PATENT DOCUMENTS

| | | |
|---|---|---|
| JP | 5521662 B2 | 6/2014 |
| KR | 10-0461123 B1 | 12/2004 |

(Continued)

*Primary Examiner* — Rodney B White

(74) *Attorney, Agent, or Firm* — Morgan, Lewis & Bockius LLP (57) ABSTRACT

A lumbar support apparatus for a vehicle seat, may include a support frame; a hinge plate mounted on a middle portion of the support frame; an upper end plate mounted on an upper end portion of the support frame; a lower end plate mounted on a lower end portion of the support frame; and a rotary supporting shaft having both side end portions fixed to a seatback frame, and having an anti-rotation bending end portion supported by the rear surface of the hinge plate, wherein the rotary supporting shaft is inserted into a hinge holder formed on the rear surface of the hinge plate for rotating the hinge plate.

15 Claims, 10 Drawing Sheets

(56) References Cited

U.S. PATENT DOCUMENTS

| | | | | |
|---|---|---|---|---|
| 4,295,681 A * | 10/1981 | Gregory | A47C 7/462 | 297/284.4 |
| 4,564,235 A * | 1/1986 | Hatsutta | B60N 2/66 | 297/284.4 |
| 4,678,230 A * | 7/1987 | Winkle | A47C 7/462 | 297/284.4 |
| 5,088,790 A * | 2/1992 | Wainwright | A47C 7/462 | 297/284.4 |
| 5,224,757 A * | 7/1993 | Geitz | A47C 7/462 | 297/284.4 X |
| 5,318,341 A * | 6/1994 | Griswold | B60N 2/233 | 297/284.4 |
| 5,449,219 A * | 9/1995 | Hay | B60N 2/6671 | 297/284.4 |
| 5,697,672 A * | 12/1997 | Mitchell | B60N 2/6671 | 297/284.4 |
| 5,913,569 A * | 6/1999 | Klingler | B60N 2/6671 | 297/284.4 |
| 6,092,871 A * | 7/2000 | Beaulieu | A47C 7/462 | 297/284.4 |
| 6,619,739 B2 * | 9/2003 | McMillen | A47C 7/462 | 297/284.4 X |
| 7,854,479 B2 * | 12/2010 | Mundell | A47C 7/465 | 297/284.4 |
| 8,651,575 B2 * | 2/2014 | Okamoto | B60N 2/42727 | 297/284.4 |
| 8,708,411 B2 * | 4/2014 | Nakamura | B60N 2/4228 | 297/284.4 |
| 9,193,287 B2 * | 11/2015 | McMillen | B60N 2/0232 | |
| 9,796,308 B2 * | 10/2017 | Agarwal | B60N 2/6673 | |
| 2002/0113472 A1 * | 8/2002 | Blendea | B60N 2/6673 | 297/284.4 |
| 2003/0184139 A1 * | 10/2003 | Sloan, Jr. | A47C 7/462 | 297/284.4 |
| 2006/0061168 A1 * | 3/2006 | Massara | B60N 2/6671 | 297/284.4 |
| 2006/0131938 A1 * | 6/2006 | Moriggi | B60N 2/0228 | 297/284.4 |
| 2007/0057550 A1 * | 3/2007 | Beyer | A47C 7/46 | 297/284.4 |
| 2008/0018154 A1 * | 1/2008 | Chou | A47C 1/026 | 297/284.4 |
| 2009/0079245 A1 * | 3/2009 | Marcantoni | A47C 7/465 | 297/284.4 |
| 2009/0096263 A1 * | 4/2009 | Samain | A47C 7/465 | 297/284.4 |
| 2009/0146476 A1 * | 6/2009 | Kan | A47C 7/46 | 297/284.4 |
| 2010/0013283 A1 * | 1/2010 | Koike | B60N 2/66 | 297/284.4 |
| 2012/0007399 A1 * | 1/2012 | Jaranson | B60N 2/66 | 297/284.4 |
| 2014/0070583 A1 * | 3/2014 | McMillen | B60N 2/6671 | 297/284.4 |
| 2014/0125102 A1 * | 5/2014 | McMillen | B60N 2/02 | 297/284.4 |
| 2014/0125103 A1 * | 5/2014 | Suzuki | B60N 2/6673 | 297/284.4 X |
| 2015/0305506 A1 * | 10/2015 | Suzuki | A47C 7/462 | 297/284.4 |
| 2016/0374475 A1 * | 12/2016 | Aldrich | A47C 7/462 | 297/284.3 |

FOREIGN PATENT DOCUMENTS

| | | |
|---|---|---|
| KR | 10-2011-0029887 A | 3/2011 |
| KR | 10-1694020 B1 | 1/2017 |

* cited by examiner

LUMBAR SUPPORT DEVICE FOR VEHICLE SEAT

CROSS-REFERENCE TO RELATED APPLICATION

The present application claims priority to Korean Patent Application No. 10-2019-0046574 filed on Apr. 22, 2019, the entire contents of which is incorporated herein for all purposes by this reference.

BACKGROUND OF THE INVENTION

Field of the Invention

The present invention relates to a lumbar support device for a vehicle seat, and more particularly, to a lumbar support device for a vehicle seat, which can prevent a neck injury while increasing a waist supporting force of a passenger.

Description of Related Art

As is well-known, a vehicle seat is configured to include a seat cushion for supporting a lower body including a hip, a seatback for leaning a waist and an upper body, a headrest for supporting a head and a neck portion, etc.

Among the present seat configuration, the seatback is mounted with various convenience devices related to the seatback such as a reclining mechanism, a bolster expansion mechanism, and a lumbar support mechanism.

Figure 1:
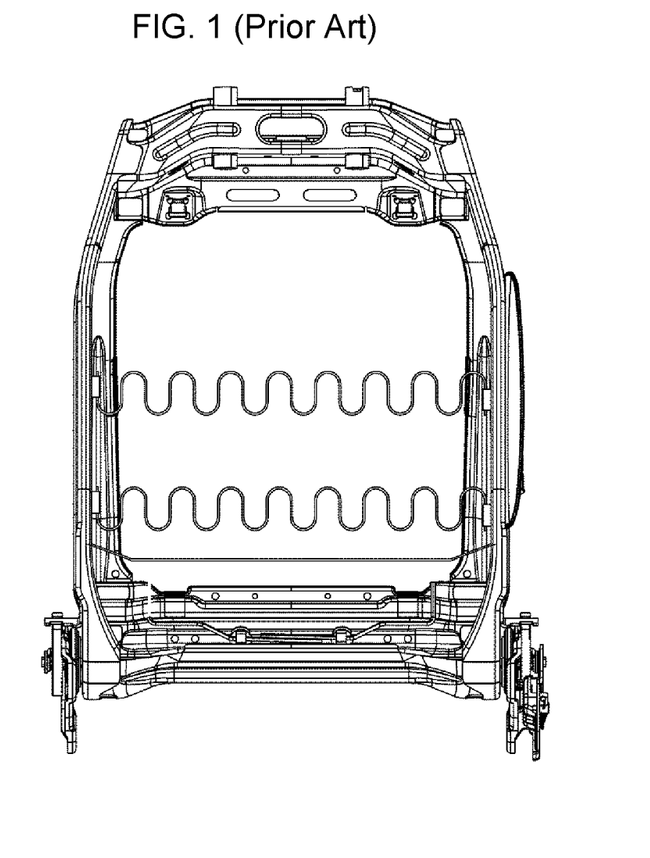
FIG. 1 is a front diagram illustrating a lumbar support structure according to one conventional example.
Figure 2A:
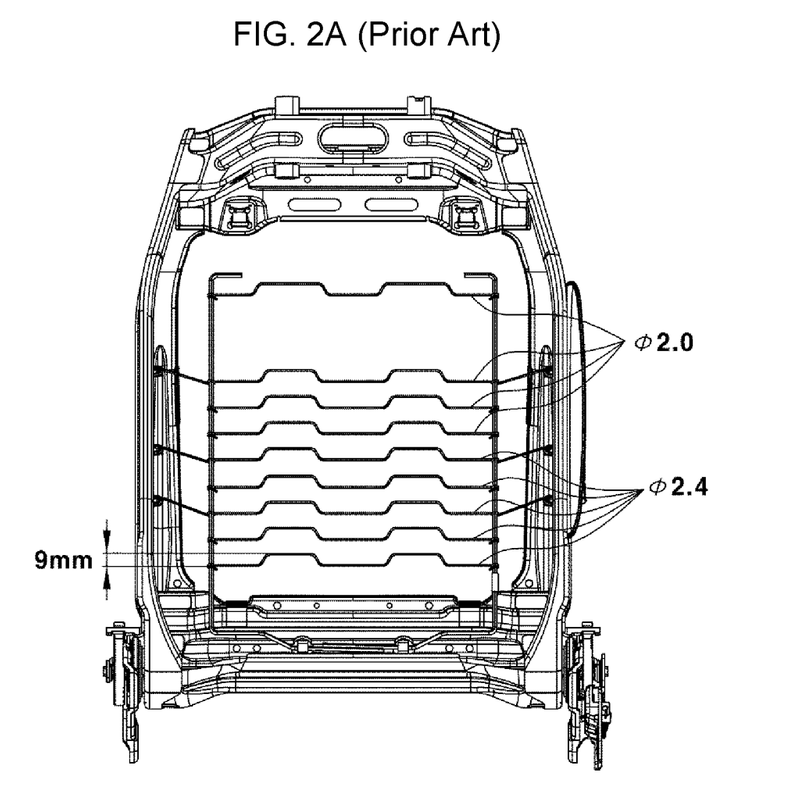
FIG. 2A and FIG. 2B are front diagrams illustrating a plumaflex type lumbar support according to another conventional example.
Figure 2B:
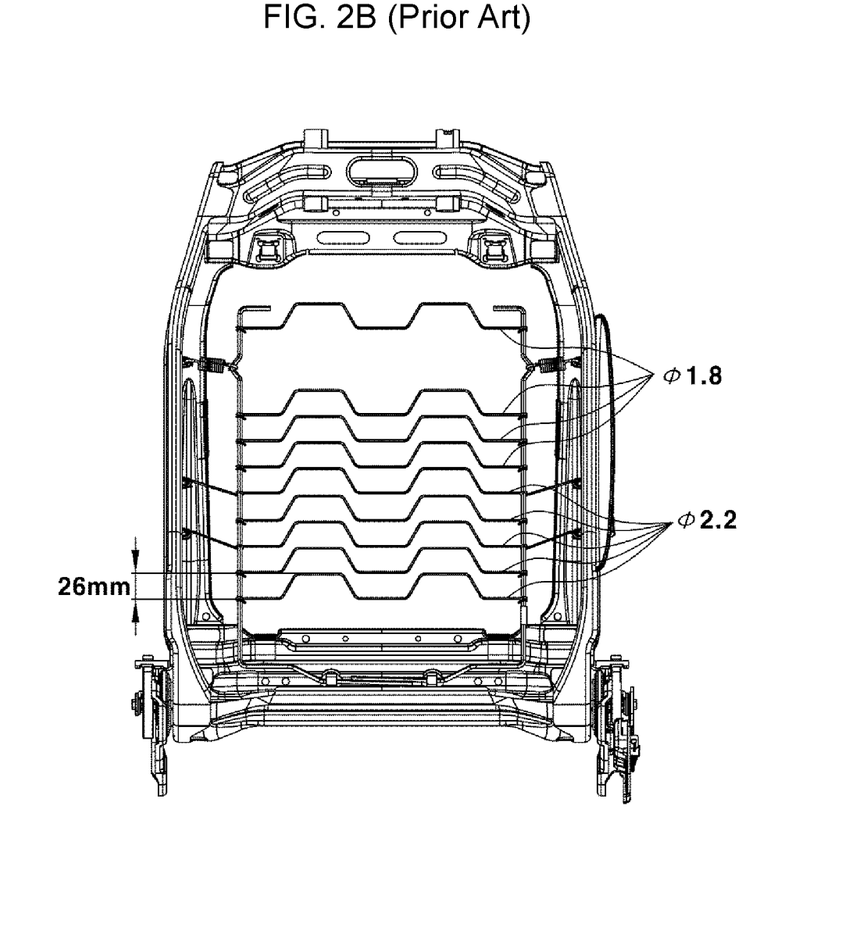

The lumbar support is a device configured for supporting the waist portion of a passenger, and applies a type in which an S-spring is coupled to a seatback frame as illustrated in FIG. 1, a so-called plumaflex type in which a vertical wire and a horizontal wire are coupled as illustrated in FIG. 2A and FIG. 2B, etc.

The plumaflex type is a type of coupling a plurality of horizontal wires bent in zig-zag between the vertical wires mounted at both sides thereof, and connecting the vertical wire to the seatback frame by a spring, and not only the waist supporting force is changed but also the supporting force against the back portion above the waist is also changed according to the diameter and the bending height of each wire.

For example, as illustrated in FIG. 2B, a case of applying by increasing the horizontal wires in the lower end five rows of the plurality of horizontal wires at φ2.4 while applying by increasing the horizontal wires in the upper end portion four rows thereof at φ2.0, and applying by reducing the bending height of each horizontal wire at about 9 mm can further increase the waist supporting force securely, and furthermore, the supporting force against the back portion above the waist is also increased securely, as compared to a case of applying the horizontal wires in the lower end five rows of the plurality of horizontal wires at φ2.2 while applying the horizontal wires in the upper end four rows thereof at φ1.8, and applying the bending height of each horizontal wire at about 26 mm, as illustrated in FIG. 2A.

As described above, when the diameter and the bending height of the horizontal wire are increased, the waist supporting force and the supporting force against the back portion above the waist are increased, such that the passenger can feel more comfortable at the long distance traveling.

However, there is a problem in that when the waist supporting force is increased by increasing the diameter and the bending height of the horizontal wire, the waist portion of the passenger is not well buried in the seatback and securely supported therein, such that the distance between the head of the passenger and the headrest is separated as compared to before the waist supporting force is increased, increasing the risk of a neck injury while the head is excessively bent rearwards upon rearward collision.

More There is a problem in that when the waist supporting force and the supporting force against the back portion right above the waist are increased by increasing the diameter and the bending height of the horizontal wire, the back portion above the waist of the passenger is not well buried in the seatback and securely supported even if the back portion above the waist of the passenger is bent rearwards upon rearward collision to press the seatback, such that the distance between the head of the passenger and the headrest is not reduced, increasing the risk of a neck injury while the head is excessively bent rearwards thereof.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a lumbar support device configured for a vehicle seat, which improves as a structure configured for reducing a neck injury upon rearward collision while keeping a waist supporting force of a passenger at a rigid level.

An exemplary embodiment of the present invention for achieving the object provides a lumbar support device configured for a vehicle seat including a support frame; a hinge plate mounted on a middle portion of the support frame; an upper end plate mounted on an upper end portion of the support frame; a lower end plate mounted on a lower end portion of the support frame; and a rotary supporting shaft having both side ends fixed to a seatback frame, and having an anti-rotation bending end portion supported by the rear surface of the hinge plate, and the rotary supporting shaft is inserted into a hinge holder formed on the rear surface of the hinge plate for rotating the hinge plate.

In an exemplary embodiment of the present invention, the support frame may include a vertical wire fixed to both side end portions of the hinge plate and extending to the upper end plate and the lower end plate, and a horizontal wire bent from upper and lower end portions of the vertical wire and fixed to the rear surface of the upper end plate and the rear surface of the lower end plate.

A fixing holder into which the horizontal wire is inserted and fixed is integrally formed on the rear surface of the upper end plate and the rear surface of the lower end plate.

In an exemplary embodiment of the present invention, the anti-rotation bending end portion thereof is formed to be bent in a 'U' shape downwards from a middle portion of the rotary supporting shaft.

An exemplary embodiment of the present invention may further include a support spring connected to the upper end plate and the lower end plate to provide an elastic supporting force.

The support spring is vertically mounted at the front side of the hinge plate, has the upper end portion fixed to the rear surface of the upper end plate, and has the lower end portion fixed to the rear surface of the lower end plate.

A hollow holder into which the support spring is inserted and fixed is integrally formed on the rear surface of the upper end plate and the rear surface of the lower end plate.

According to an exemplary embodiment of the present invention, when a pressing force against the front surface of the lower end plate is greater than a pressing force against the front surface of the upper end plate, the hinge plate is in close contact with the anti-rotation bending end portion of the rotary supporting shaft and is not rotated.

According to an exemplary embodiment of the present invention, when a pressing force against the front surface of the upper end plate is greater than a pressing force against the front surface of the lower end plate, the hinge plate is separated from the anti-rotation bending end portion of the rotary supporting shaft and is rotated.

Another exemplary embodiment of the present invention for achieving the object provides a lumbar support device configured for a vehicle seat including a support frame; a hinge plate mounted on a middle portion of the support frame; an integral plate provided to cover front surface portions of the support frame and the hinge plate, and having upper and lower end portions fixed to upper end portion and lower end portion of the support frame, respectively; and a rotary supporting shaft having both side end portions fixed to a seatback frame, and having an anti-rotation bending end portion supported by the rear surface of the hinge plate, and the rotary supporting shaft is inserted into a hinge holder formed on the rear surface of the hinge plate for rotating the hinge plate.

In another exemplary embodiment of the present invention, the support frame may include a vertical wire fixed to both side end portions of the hinge plate and extending to the upper end portion and the lower end portion of the integral plate, and a horizontal wire bent from upper and lower end portions of the vertical wire and fixed to the rear surfaces of the upper end portion and the lower end portion of the integral plate.

A fixing holder into which the horizontal wire is inserted and fixed is integrally formed on the rear surface of the upper end portion and the rear surface of the lower end portion of the integral plate.

In another exemplary embodiment of the present invention, the anti-rotation bending end portion is formed to be bent in a 'U' shape downwards from a middle portion of the rotary supporting shaft.

According to various exemplary embodiments of the present invention, when a pressing force against the front lower end portion of the integral plate is greater than a pressing force against the front upper end portion thereof, the hinge plate is in close contact with the anti-rotation bending end portion of the rotary supporting shaft and is not rotated.

According to various exemplary embodiments of the present invention, when a pressing force against the front upper end portion of the integral plate is greater than a pressing force against the front lower end portion thereof, the hinge plate is separated from the anti-rotation bending end portion of the rotary supporting shaft and is rotated.

Various aspects of the present invention provide the following effects through the above configuration.

Firstly, it is possible not to reduce the supporting force against the waist portion of the passenger accommodated in the seat, and to keep it at a constantly rigid level at all times, providing constant waist comfort to the passenger at the long distance traveling.

Secondly, it is possible to reduce the distance between the head of the passenger and the headrest while the back portion above the waist of the passenger is well buried in the seatback when the back portion above the waist of the passenger is bent rearwards upon rearward collision to press the seatback, preventing the phenomenon that the head of the passenger is rested by directly contacting the headrest and a neck is excessively bent, and minimizing a neck injury.

Thirdly, it is possible to save the number of parts as compared to the conventional plumaflex type lumbar supporter, saving the cost.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and may include hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various exemplary features illustrative of the basic principles of the disclosure. The specific design features of the present invention as included herein, including, for example, specific dimensions, orientations, locations, and shapes will be determined in section by the particular intended application and use environment.

In the drawings, reference numbers refer to the same or equivalent sections of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, exemplary embodiments of the present invention will be described in detail with reference to the accompanying drawings.

Figure 3:
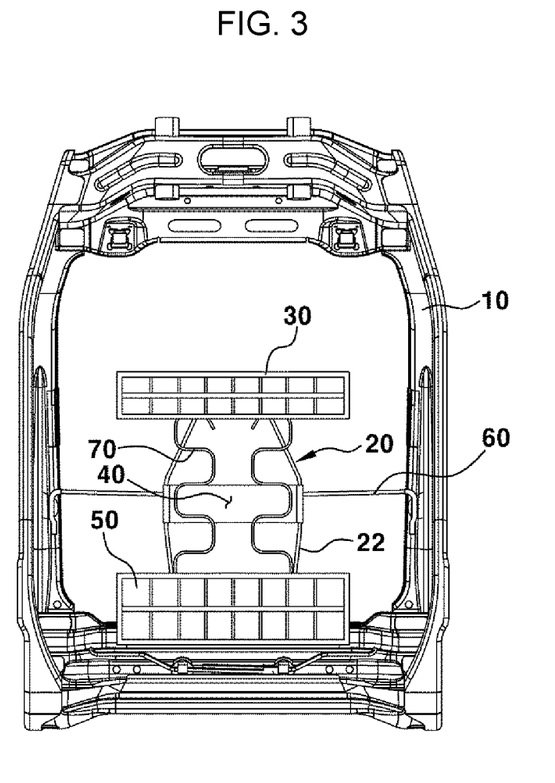
FIG. 3 is a front diagram illustrating a lumbar support device configured for a vehicle seat according to an exemplary embodiment of the present invention.
Figure 4:
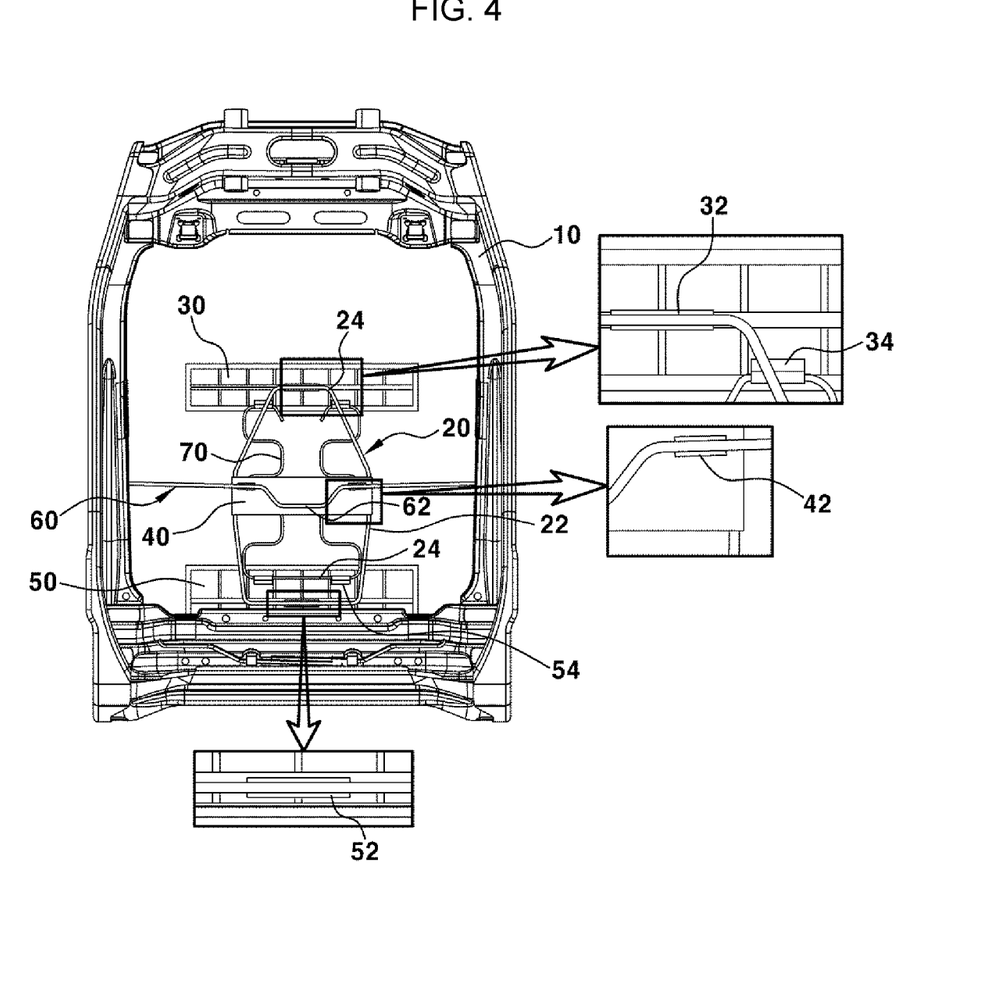
FIG. 4 is a rear diagram illustrating the lumbar support device configured for the vehicle seat according to an exemplary embodiment of the present invention.

FIG. 3 and FIG. 4 illustrate a lumbar support device configured for a vehicle seat according to an exemplary embodiment of the present invention, and reference numeral 10 denotes a seatback frame.

The seatback frame 10 is a portion which is mounted inside a seatback of a vehicle to form a frame of the seatback, and a support frame 20 is mounted in the internal region of the seatback frame 10 over a range where a waist and a back portion above the waist of a passenger contact.

At the instant time, an upper end plate 30 is mounted on the upper end portion of the support frame 20, a hinge plate 40 is mounted on the middle portion of the support frame 20, and a lower end plate 50 is mounted on the lower end portion of the support frame 20.

Therefore, the upper end plate 30 mounted on the upper end portion of the support frame 20 is pressurally mounted at a position where the back portion of the passenger contacts, and the lower end plate 50 mounted on the lower end portion of the support frame 20 is pressurally mounted at a position where the waist of the passenger contacts.

Meanwhile, the support frame 20 includes a vertical wire 22 fixed to both side end portions of the hinge plate 40 and extending to the upper end plate 30 and the lower end plate 50 sides, and a horizontal wire 24 bent from the upper and lower end portions of the vertical wire 22 and fixed to the rear surface of the upper end plate 30 and the rear surface of the lower end plate 50.

Preferably, fixing holders 32, 52 into which the horizontal wire 24 is inserted and fixed are integrally formed on the rear surface of the upper end plate 30 and the rear surface of the lower end plate 50.

Furthermore, a rotary supporting shaft 60 is horizontally mounted across the internal region of the seatback frame 10, and both end portions of the rotary supporting shaft 60 are fixed to both side portions of the seatback frame 10 by welding, etc.

An anti-rotation bending end portion 62 supported by the rear surface of the hinge plate 40 is formed on the middle portion of the rotary supporting shaft 60.

The anti-rotation bending end portion 62 is formed to be bent in a 'U' shape downwards from a middle portion of the rotary supporting shaft 60.

At the instant time, the hinge plate 40 is rotatably fastened to the rotary supporting shaft 60.

For the present purpose, the rotary supporting shaft 60 is inserted into and fastened to a hinge holder 42 formed on the rear surface of the hinge plate 40 so that the hinge plate 40 can rotate around the rotary supporting shaft 60.

The hinge plate 40 is rotatably fastened to the rotary supporting shaft 60 in a state where the hinge plate 40 has been mounted on the middle portion of the support frame 20, the upper end plate 30 has been mounted on the upper end portion thereof, and the lower end plate 50 has been mounted on the lower end portion thereof so that the upper end plate 30 and the lower end plate 50 may be rotated together when the hinge plate 40 rotates.

Meanwhile, a support spring 70 is connected between the upper end plate 30 and the lower end plate 50 to provide an elastic supporting force to the passenger while increasing the connecting rigidity between the upper end plate 30 and the lower end plate 50.

The support spring 70 is provided in pair which is repetitively bent in a zig-zag shape to be mounted vertically, has the upper end portion fixed to the rear surface of the upper end plate 30, and has the lower end portion fixed to the rear surface of the lower end plate 50 so that it is mounted to be elastically supportable at the front side of the hinge plate 40.

The upper end portion and the lower end portion of the support spring 70 are inserted into and fastened to, and fixed to hollow holders 34, 54 formed on the rear surface of the upper end plate 30 and the rear surface of the lower end plate 50, respectively.

Herein, an operating state of the lumbar support device according to an exemplary embodiment of the present invention will be referred to as follows.

Figure 5A:
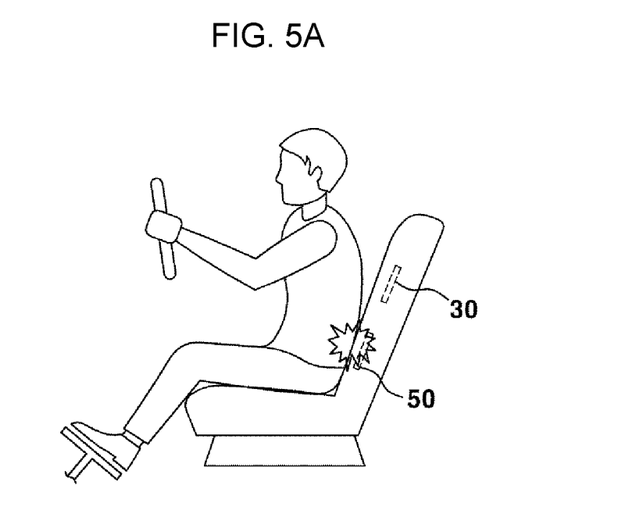
FIG. 5A, FIG. 5B, and FIG. 5C are operating diagrams illustrating an operation in which a waist supporting force of a passenger is kept by the lumbar support device configured for the vehicle seat according to an exemplary embodiment of the present invention.
Figure 5B:
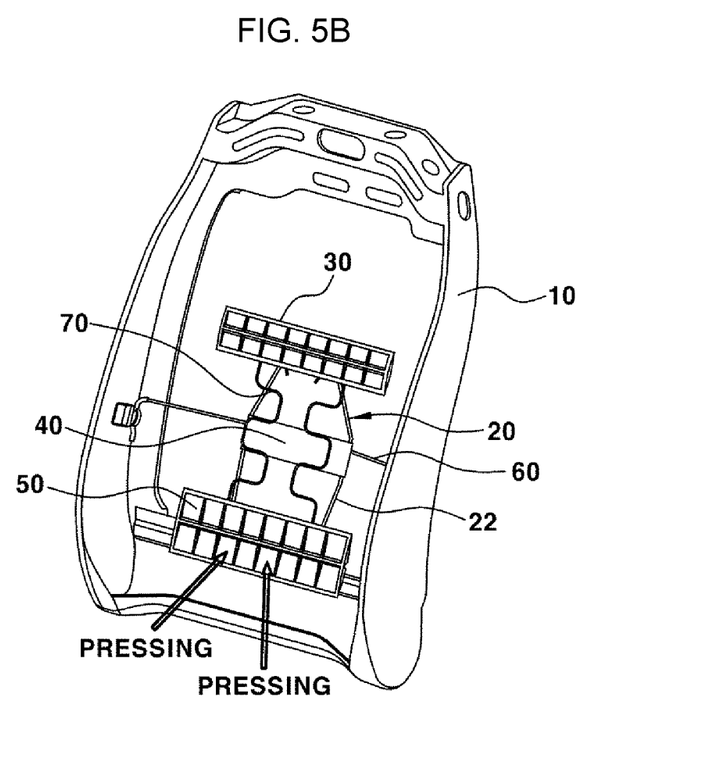
Figure 5C:
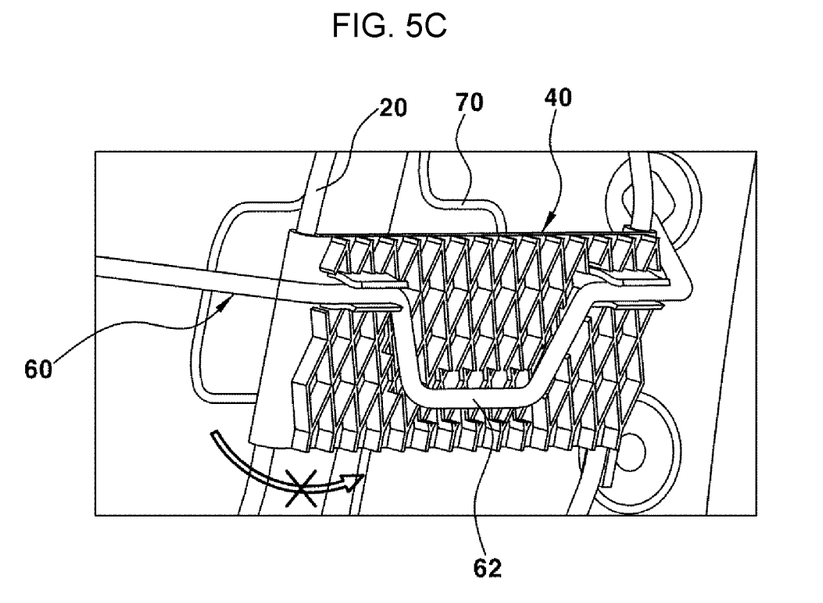

FIG. 5A, FIG. 5B, and FIG. 5C are operating diagrams illustrating an operation in which a waist supporting force of a passenger is kept by the lumbar support device configured for the vehicle seat according to an exemplary embodiment of the present invention.

Referring to FIG. 5A, the waist portion of the passenger is supported by the lower end plate 50 in a state where the passenger has leaned against the seatback.

At the instant time, when a pressing force (e.g., a body pressure at which the waist of the passenger contacts) against the front surface of the lower end plate 50 is greater than a pressing force (e.g., a body pressure at which the back portion above the waist of the passenger contacts) against the front surface of the upper end plate 30, the hinge plate 40 is in close contact with the anti-rotation bending end portion 62 of the rotary supporting shaft 60 and is not rotated.

That is, when the pressing force against the front surface of the lower end plate 50 is greater than the pressing force against the front surface of the upper end plate 30, the upper end portion of the hinge plate 40 tries to rotate forwards and the lower end portion thereof tries to rotate rearwards, but as illustrated in FIG. 5C, the anti-rotation bending end portion 62 of the rotary supporting shaft 60 is configured as a stopper for blocking the rotation of the hinge plate 40, such that the hinge plate 40 is not rotated.

Therefore, when the hinge plate 40 is not rotated, the upper end plate 30 and the lower end plate 50 connected to the hinge plate 40 by the support frame 20 are not rotated.

Therefore, the waist portion of the passenger may be easily supported by the lower end plate 50 in a state where the passenger has leaned against the seatback, and the lower end plate 50 can support the waist portion of the passenger at a constant supporting force.

That is, the lower end plate 50 can support the waist portion of the passenger at a constantly rigid level at all times, not reducing the supporting force against the waist portion of the passenger accommodated in the seat, and providing constant waist comfort to the passenger at the long distance traveling.

Figure 6A:
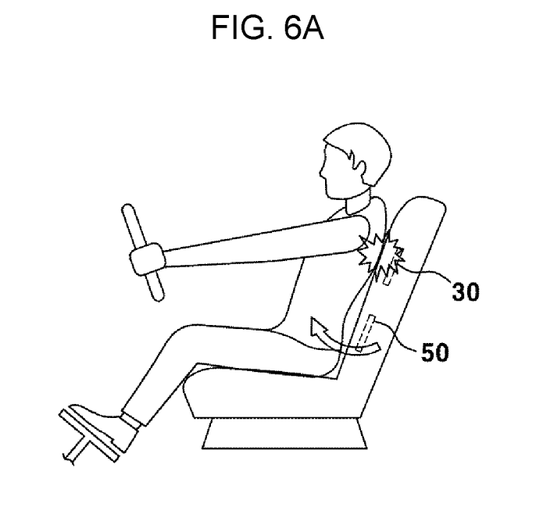
FIG. 6A, FIG. 6B, and FIG. 6C are operating diagrams illustrating an operation in which a neck injury is prevented upon rearward collision by the lumbar support device configured for the vehicle seat according to an exemplary embodiment of the present invention.
Figure 6B:
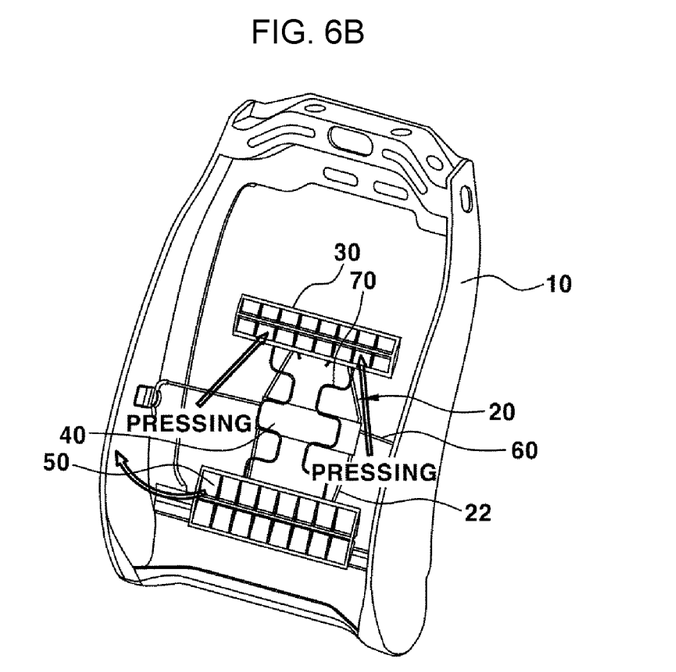
Figure 6C:
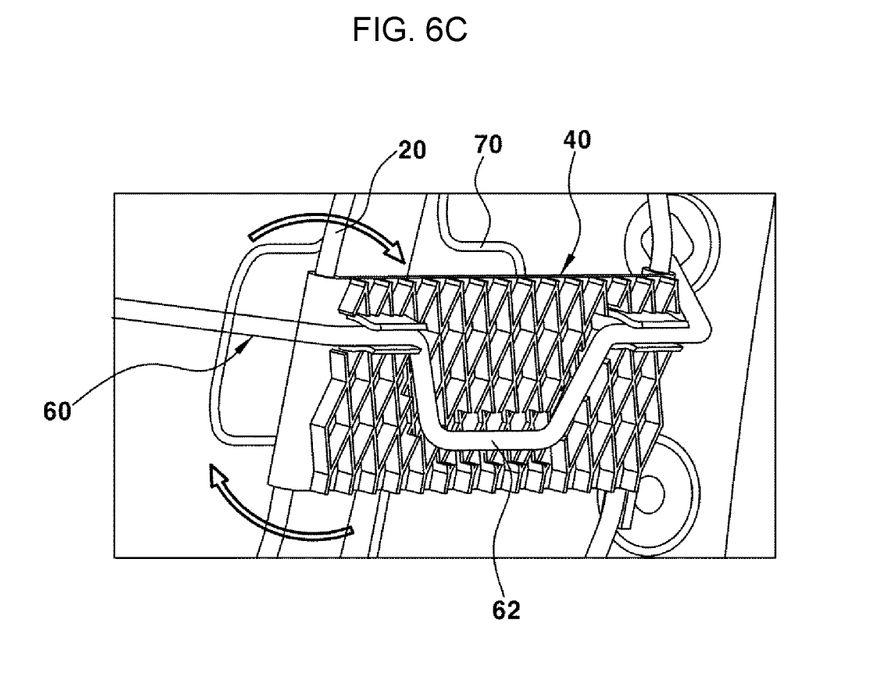

FIG. 6A, FIG. 6B, and FIG. 6C are operating diagrams illustrating an operation in which a neck injury is prevented upon rearward collision by the lumbar support device configured for the vehicle seat according to an exemplary embodiment of the present invention.

Referring to FIG. 6A and FIG. 6B, the back portion above the waist of the passenger is supported by the upper end plate 30 in a state where the passenger has leaned against the seatback.

At the instant time, when a pressing force (e.g., a body pressure at which the back portion above the waist of the passenger contacts) against the front surface of the upper end plate 30 is greater than a pressing force (e.g., a body pressure at which the waist portion of the passenger contacts) against the front surface of the lower end plate 50, the hinge plate 40 is separated from the anti-rotation bending end portion 62 of the rotary supporting shaft 60 and is rotated.

That is, when a pressing force against the front surface of the upper end plate 30 is greater than a pressing force against the front surface of the lower end plate 50, as illustrated in FIG. 6C, the hinge plate 40 is separated from the anti-rotation bending end portion 62 of the rotary supporting shaft 60, and simultaneously, the upper end portion of the hinge plate 40 rotates rearwards and the lower end portion thereof rotates forwards around the rotary supporting shaft 60.

As described above, when the hinge plate 40 rotates, the upper end plate 30 rotates rearwards and simultaneously, the lower end plate 50 rotates forwards, which have been connected to the hinge plate 40 by the support frame 20.

Therefore, the distance between the head of the passenger and the headrest is reduced while the back portion above the waist of the passenger is well buried in the seatback, and the supporting force against the waist portion of the passenger is further increased by the lower end plate 50 that rotates forwards.

Therefore, when the back portion above the waist of the passenger is bent rearwards upon rearward collision to press the seatback, as described above, the upper end plate 30 rotates rearwards and simultaneously, the lower end plate 50 rotates forwards when the hinge plate 40 rotates, such that the distance between the head of the passenger and the headrest may be reduced while the back portion above the waist of the passenger is well buried in the seatback, preventing the phenomenon that the head of the passenger is rested by directly contacting the headrest and a neck is excessively bent, and minimizing a neck injury.

Herein, another exemplary embodiment of the lumbar support device of the present invention will be referred to as follows.

Figure 7A:
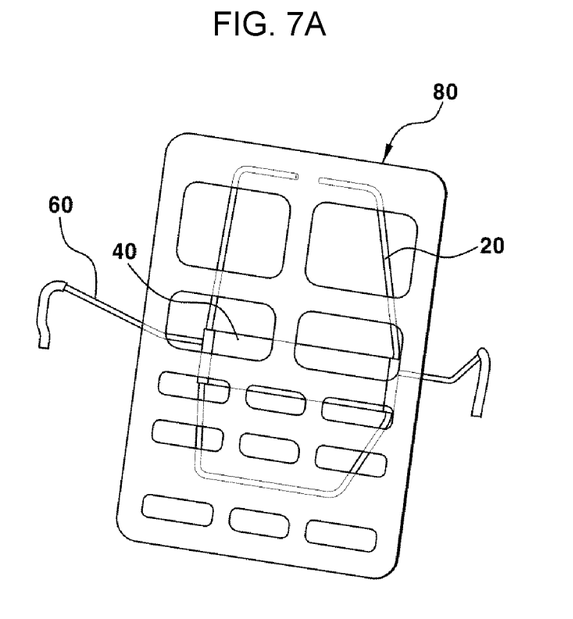
FIG. 7A, FIG. 7B, and FIG. 7C are diagrams illustrating a lumbar support device configured for a vehicle seat according to various exemplary embodiments of the present invention.
Figure 7B:
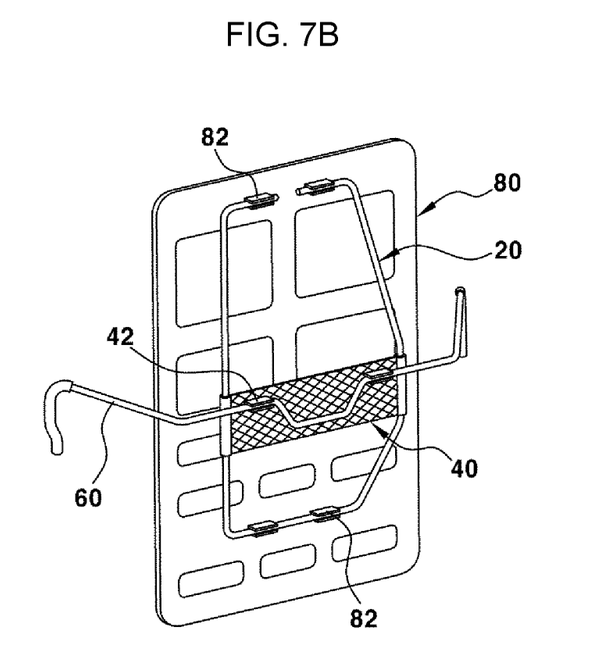
Figure 7C:
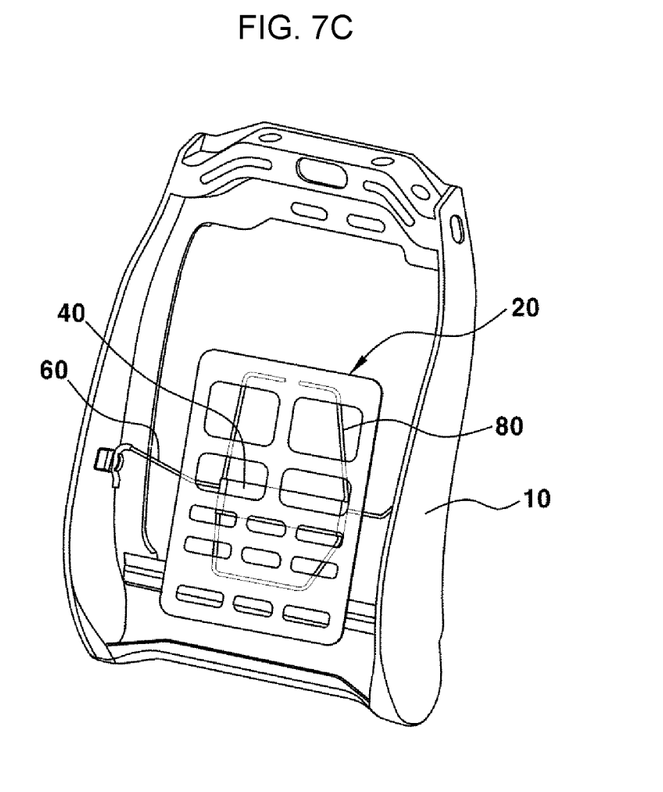

FIG. 7A, FIG. 7B, and FIG. 7 Care diagrams illustrating a lumbar support device configured for a vehicle seat according to various exemplary embodiments of the present invention.

Another exemplary embodiment of the present invention is the same as a configuration of the above-described embodiment, except that the upper end plate 30 and the lower end plate 50 in the above-described embodiment are improved by an integral plate 80.

The integral plate 80 is provided at a size that covers the front surface portions of the support frame 20 and the hinge plate 40, and has the upper and lower end portions fixed to the upper end portion and the lower end portion of the support frame 20, respectively.

Therefore, the upper end portion of the integral plate 80 is pressurally mounted at a position where the back portion of the passenger contacts, and the lower end portion thereof is pressurally mounted at a position where the waist of the passenger contacts.

Meanwhile, the support frame 20 has the same structure as the above-described embodiment, and includes the vertical wire 22 fixed to both side end portions of the hinge plate 40 and extending to the upper end portion and the lower end portion of the integral plate 80, and the horizontal wire 24 bent from the upper and lower end portions of the vertical wire 22 and fixed to the rear surfaces of the upper end portion and the lower end portion of the integral plate 80.

A fixing holder 82 into which the horizontal wire 24 is inserted and fixed is integrally formed on the rear surface of the upper end portion and the rear surface of the lower end portion of the integral plate 80.

Furthermore, even in another exemplary embodiment of the present invention, the rotary supporting shaft 60 is horizontally mounted across the internal region of the seatback frame 10, and both end portions of the rotary supporting shaft 60 are fixed to both side portions of the seatback frame 10 by welding, etc.

The anti-rotation bending end portion 62 supported by the rear surface of the hinge plate 40 is formed on the middle portion of the rotary supporting shaft 60, and the anti-rotation bending end portion 62 is formed to be bent in a 'U' shape downwards from a middle portion of the rotary supporting shaft 60.

Furthermore, even in another exemplary embodiment of the present invention, the rotary supporting shaft 60 is inserted into and fastened to the hinge holder 42 formed on the rear surface of the hinge plate 40 so that the hinge plate 40 can rotate around the rotary supporting shaft 60.

As described above, the hinge plate 40 is mounted on the middle portion of the support frame 20, and the integral plate 80 has the upper and lower end portions fixed to the upper end portion and the lower end portion of the support frame 20, respectively, while covering the front surface portions of the support frame 20 and the hinge plate 40 so that the integral plate 80 can also rotate together when the hinge plate 40 rotates.

Therefore, when a pressing force against the front lower end portion of the integral plate 80 is greater than a pressing force against the front upper end portion thereof, the upper end portion of the hinge plate 40 tries to rotate forwards and the lower end portion thereof tries to rotate rearwards, but as described above, the anti-rotation bending end portion 62 of the rotary supporting shaft 60 is configured as a stopper for blocking the rotation of the hinge plate 40, such that the hinge plate 40 is not rotated.

Therefore, when the hinge plate 40 is not rotated, the integral plate 80 connected to the hinge plate 40 by the support frame 20 is not rotated either.

Therefore, the waist portion of the passenger may be easily supported by the lower end portion of the integral plate 80 in a state where the passenger has leaned against the seatback, and the lower end portion of the integral plate 80 can support the waist portion of the passenger at a constant supporting force.

That is, it is possible to support the waist portion of the passenger on the lower end portion of the integral plate 80 at a constantly rigid level at all times, not reducing the supporting force against the waist portion of the passenger accommodated in the seat, and providing constant waist comfort to the passenger at the long distance traveling.

Furthermore, the integral plate 80 may be convexly mounted forwards to provide an elastic supporting force against the body pressure of the passenger, removing the support spring in the above-described embodiment, and furthermore, may be formed by integrating the upper end plate 30 and the lower end plate 50 in the above-described embodiment into one portion, saving the number of parts.

On the other hand, when a pressing force against the front upper end portion of the integral plate 80 is greater than a pressing force against the front lower end portion thereof, the hinge plate 40 is separated from the anti-rotation bending end portion 62 of the rotary supporting shaft 60 and is rotated.

That is, when a pressing force against the front upper end portion of the integral plate 80 is greater than a pressing force against the front lower end portion thereof, as described above, the hinge plate 40 is separated from the anti-rotation bending end portion 62 of the rotary supporting shaft 60 and simultaneously, the upper end portion of the hinge plate 40 rotates rearwards and the lower end portion thereof rotates forwards around the rotary supporting shaft 60.

Therefore, the distance between the head of the passenger and the headrest is reduced while the back portion above the waist of the passenger is well buried in the seatback, and the supporting force against the waist portion of the passenger is further increased by the lower end portion of the integral plate 80 that rotates forwards.

Therefore, even in another exemplary embodiment of the present invention, when the back portion above the waist of the passenger is bent rearwards upon rearward collision to press the seatback, as described above, the upper end portion of the integral plate 80 rotates rearwards and simultaneously, the lower end portion thereof rotates forwards when the hinge plate 40 rotates, such that the distance between the head of the passenger and the headrest is reduced while the back portion above the waist of the passenger is well buried in the seatback, preventing the phenomenon that the head of the passenger is rested by directly contacting the headrest and a neck is excessively bent, and minimizing a neck injury.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A lumbar support apparatus for a vehicle seat, the lumbar support apparatus comprising:
    a support frame;
    a hinge plate mounted on a middle portion of the support frame;
    an upper end plate mounted on an upper end portion of the support frame;
    a lower end plate mounted on a lower end portion of the support frame; and
    a rotary supporting shaft having first and second side end portions fixed to a seatback frame, and having an anti-rotation bending end portion supported by a rear surface of the hinge plate,
    wherein the rotary supporting shaft is inserted into a hinge holder formed on the rear surface of the hinge plate for rotating the hinge plate, and
    wherein the hinge plate is configured to rotate around the rotary supporting shaft so that the upper end plate and the lower end plate rotate together by the support frame when the hinge plate rotates.

2. The lumbar support apparatus for the vehicle seat of claim 1, wherein the support frame includes:
    a vertical wire fixed to first and second side end portions of the hinge plate and extending to the upper end plate and the lower end plate; and
    a horizontal wire bent from upper and lower end portions of the vertical wire and fixed to a rear surface of the upper end plate and a rear surface of the lower end plate.

3. The lumbar support apparatus for the vehicle seat of claim 2,
    wherein a fixing holder into which the horizontal wire is inserted and fixed is integrally formed on the rear surface of the upper end plate and the rear surface of the lower end plate.

4. The lumbar support apparatus for the vehicle seat of claim 1,
    wherein the anti-rotation bending end portion is formed to be bent in a 'U' shape downwards from a middle portion of the rotary supporting shaft.

5. The lumbar support apparatus for the vehicle seat of claim 1, further including a support elastic member connected to the upper end plate and the lower end plate to provide an elastic supporting force.

6. The lumbar support apparatus for the vehicle seat of claim 5,
    wherein the support elastic member is perpendicularly mounted at a front side of the hinge plate, has an upper end portion fixed to a rear surface of the upper end plate, and a lower end portion fixed to a rear surface of the lower end plate.

7. The lumbar support apparatus for the vehicle seat of claim 6,
    wherein hollow holders into which the support elastic member is inserted and fixed are integrally formed on the rear surface of the upper end plate and the rear surface of the lower end plate.

8. The lumbar support apparatus for the vehicle seat of claim 1,
    wherein when a pressing force against a front surface of the lower end plate is greater than a pressing force against a front surface of the upper end plate, the hinge plate is configured to be in contact with the anti-rotation bending end portion of the rotary supporting shaft and not to be rotated.

9. The lumbar support apparatus for the vehicle seat of claim 1,
    wherein when a pressing force against a front surface of the upper end plate is greater than a pressing force against a front surface of the lower end plate, the hinge plate is configured to be separated from the anti-rotation bending end portion of the rotary supporting shaft and to be rotated.

10. A lumbar support apparatus for a vehicle seat, the lumbar support apparatus including:
a support frame;
a hinge plate mounted on a middle portion of the support frame;
an integral plate provided to cover front surface portions of the support frame and the hinge plate, and having upper and lower end portions fixed to an upper end portion and a lower end portion of the support frame, respectively; and
a rotary supporting shaft having first and second side end portions fixed to a seatback frame, and having an anti-rotation bending end portion supported by a rear surface of the hinge plate,
wherein the rotary supporting shaft is inserted into a hinge holder formed on the rear surface of the hinge plate for rotating the hinge plate, and
wherein the hinge plate is configured to rotate around the rotary supporting shaft so that the upper end portion and the lower end portion of the integral plate rotate together by the support frame when the hinge plate rotates.

11. The lumbar support apparatus for the vehicle seat of claim 10, wherein the support frame includes:
a vertical wire fixed to first and second side end portions of the hinge plate and extending to the upper end portion and the lower end portion of the integral plate; and
a horizontal wire bent from upper and lower end portions of the vertical wire and fixed to rear surfaces of the upper end portion and the lower end portion of the integral plate.

12. The lumbar support apparatus for the vehicle seat of claim 11,
wherein a fixing holder into which the horizontal wire is inserted and fixed is integrally formed on the rear surface of the upper end portion and the rear surface of the lower end portion of the integral plate.

13. The lumbar support apparatus for the vehicle seat of claim 10,
wherein the anti-rotation bending end portion is formed to be bent in a 'U' shape downwards from a middle portion of the rotary supporting shaft.

14. The lumbar support apparatus for the vehicle seat of claim 10,
wherein when a pressing force against a front lower end portion of the integral plate is greater than a pressing force against a front upper end portion thereof, the hinge plate is configured to be in contact with the anti-rotation bending end portion of the rotary supporting shaft and not to be rotated.

15. The lumbar support apparatus for the vehicle seat of claim 10,
wherein when a pressing force against a front upper end portion of the integral plate is greater than a pressing force against a front lower end portion thereof, the hinge plate is configured to be separated from the anti-rotation bending end portion of the rotary supporting shaft and to be rotated.

* * * * *